United States Patent [19]

Murphy et al.

[11] 4,338,048

[45] Jul. 6, 1982

[54] CARTRIDGE FOR ROCK-BOLTING

[75] Inventors: John M. Murphy, Mansfield; Robert H. Spensley, Swanwick, both of England

[73] Assignee: Exchem Holdings Limited, London, England

[21] Appl. No.: 41,502

[22] Filed: May 22, 1979

[30] Foreign Application Priority Data

May 31, 1978 [GB] United Kingdom ............... 25270/78
May 31, 1978 [GB] United Kingdom ............... 25272/78

[51] Int. Cl.$^3$ ..................... E21D 20/00; E21D 20/02
[52] U.S. Cl. ........................................ 405/261; 106/74; 106/76; 106/83; 106/84; 106/96; 106/287.23; 206/219
[58] Field of Search ................ 106/74, 76, 84, 287.23, 106/96, 83; 206/219; 405/261

[56] References Cited

U.S. PATENT DOCUMENTS

| | | | |
|---|---|---|---|
| 215,397 | 5/1879 | Rollins | 106/35 |
| 2,896,280 | 7/1959 | Ilenda et al. | 106/38.35 |
| 3,294,563 | 12/1966 | Williams | 106/287.34 |
| 3,493,406 | 2/1970 | Fillet et al. | 106/74 |
| 3,558,506 | 1/1971 | Bonnel et al. | 106/74 |
| 3,970,462 | 7/1976 | Stillman | 106/84 |
| 3,986,998 | 10/1976 | Schmitt et al. | 106/35 |
| 3,990,903 | 11/1976 | Mallow | 106/84 |
| 4,096,944 | 6/1978 | Simpson | 206/219 |
| 4,126,005 | 11/1978 | Coursen | 106/90 |
| 4,136,774 | 1/1979 | Ghoshal | 206/219 |

OTHER PUBLICATIONS

Chem. Abst. 81:50,732h, 1974; 83:209,056f.

*Primary Examiner*—Allan Lieberman
*Attorney, Agent, or Firm*—Browdy and Neimark

[57] ABSTRACT

A frangible cartridge for anchoring a reinforcing element such as a rock-bolt in a borehole drilled in rock strata, for example an underground mine roof, contains as separate constituents (A) an aqueous liquid and an alkali metal silicate and (B) a gelling agent for the alkali metal silicate, the gelling agent being capable of forming a gel from the alkali metal silicate when brought into contact therewith as a result of the reinforcing element being caused to break the cartridge and mix together the constituents (A) and (B) within the borehole so as to form a grouting composition around the reinforcing element, the grouting composition when hardened serving to anchor the reinforcing element in the borehole. In a preferred embodiment, a hydraulic substance such as a hydraulic cement is incorporated in constituent (B) and is hardened by the aqueous liquid present in constituent (A) when the contents of the cartridge are mixed by the reinforcing element. The cartridge of the invention is safer for use, particularly in coal mines, than the conventional resinous cartridges.

12 Claims, No Drawings

CARTRIDGE FOR ROCK-BOLTING

This invention relates to the anchoring of a reinforcing element, such as a steel rock bolt or wooden dowel, in a borehole drilled into rock strata, for example the roof of an underground mine, by means of a grouting system which is introduced into the borehole in the form of a cartridge and is activated in situ by contact with a reinforcing element so as rapidly to form a hardened grout in the annulus between the reinforcing element and the wall of the borehole, whereby the reinforcing member is firmly anchored in the borehole in as short a time as practicable.

For the last ten years or so, the most convenient and technically advantageous method of installing a reinforcing element in a rock borehole has relied upon the use of frangible resinous cartridges, one or more of which are inserted into and pushed to the end of the borehole, following which the reinforcing element is inserted whilst rotating into the borehole so as to break the cartridges and cause the contents thereof to become mixed, thereby forming a resinous grout around the reinforcing element in the borehole which anchors the element in the borehole. Such resinous cartridges are mostly filled with an unsaturated polyester resin system and a hardening (i.e. curing) agent therefor, the latter being kept separate from the unsaturated resin system, for example by use a two compartment cartridge, until mixed by the action of the reinforcing element.

In certain areas of utilisation, cartridges containing unsaturated polyester resin systems present hazards which have lately become of increasing concern. In particular, the low resistance to flammability and the toxicity of their combustion products make such resinous cartridges a source of danger when used or stored in restricted areas, such as in coal mines.

It is an object of the present invention to provide a frangible cartridge for use in rock-bolting which will avoid the flammability and/or toxicity hazards of the polyester-based resinous cartridges.

According to the invention there is provided a cartridge for anchoring a reinforcing element in a borehole, the cartridge comprising an outer tubular frangible casing having disposed therein in separate compartments (A) an aqueous liquid and an alkali metal silicate, optionally together with an alkali metal siliconate, and (B) a gelling agent for the alkali metal silicate, said gelling agent being capable of forming a gel from the alkali metal silicate when brought into contact therewith so as to form a grouting composition capable of anchoring the reinforcing element in the borehole.

In a preferred embodiment of the invention, the constituent (B) also comprises a hydraulic substance, the gelling agent in constituent (B) being inert with respect to the hydraulic substance, whereby when in use constituents (A) and (B) are caused to mix in situ, the hydraulic substance is brought into contact with the aqueous liquid present in constituent (A) and is thereby caused to set to a hardened mass which assists in anchoring the reinforcing element in the borehole.

The cartridge of the invention may have one compartment formed by a longitudinally extending inner frangible casing which is disposed within the longitudinally extending frangible outer casing of the cartridge, the annular space between the inner casing and the outer casing forming the other compartment. The outer compartment may contain the constituent (B), with the inner compartment containing the constituent (A), or vice versa.

The alkali metal silicate is advantageously sodium or potassium silicate, sodium silicate being preferred because of its lower cost and general availability. The constituent (A) may be formed, for example by admixing an aqueous sodium or potassium silicate solution with a sodium or potassium silicate in solid form, for example spray-dried sodium silicate. The alkali metal silicate preferably has a silica: alkali metal oxide molar ratio in the range from 1.65 to 3.3:1. This ratio may be increased, if desired, by the addition of solid silica, preferably in a finely-divided form. The aqueous liquid present in constituent (A) is normally water.

The gelling agent present in constituent (B) is a substance capable of converting the alkali metal silicate present in constituent (A) into a gel. SUch gelling agents include aliphatic carboxylic acids, for example acetic acid, and acid-producing substances such as esters and partial esters, for example of formic, acetic, propionic, phosphoric, nitric or sulphuric acid and an alcohol, glycol or polyol, acid chlorides, acid anhydrides, acid amides and lactones, for example $\beta$-propiolactone or $\gamma$-butyrolactone. In addition to or in place of the foregoing gelling agents there may be used a solid gelling agent, for example ammonium or alkali metal chloride, bromide, sulphate, nitrate, bicarbonate, hydrogen phosphate, pyrophosphate, bisulphate, bisulphite, aluminate, zincate, fluorosilicate, silicide, or fluoroborate; boric acid; a water-soluble acidic alkali metal or ammonium salt of an organic acid, e.g. potassium hydrogen tartrate; a water-soluble reactive salt of a multivalent metal which hydrolyses to form an acidic solution, e.g. aluminium chloride, zinc bromide, magnesium nitrate or ferric sulphate; an oxide, hydroxide, carbonate, bicarbonate, silicide, silicate, fluorosilicate, borate, fluoroborate or aluminate of a multivalent metal; or an organic acid or acid-producing substance, e.g. succinic, tartaric, citric, oxalic, phthalic or benzoic acid, a sulphonic acid, e.g. benzene sulphonic or p-toluene-sulphonic acid, phenol, picric acid, a carboxylic acid ester, e.g. phenyl propionate, 1-naphthyl acetate or benzyl succinate, an aldehyde or a ketone.

If the gelling agent is not in liquid form, a non-aqueous liquid vehicle may be used in forming the constituent (B), for example polypropylene glycol, propylene glycol, triethylene glycol or glycerol.

In the preferred embodiment of the invention, wherein the gelling agent for the alkali metal silicate is in admixture with a hydraulic substance, preferably a hydraulic cement, the gelling agent must be inert with respect to the hydraulic substance and also compatible with the hardening process involving the hydraulic substance when the latter comes into contact with the aqueous liquid present in constituent (A), i.e. the gelling agent should not interfere with the hardening process to prevent the grouting composition formed from constituents (A) and (B) from gaining sufficient strength on setting to be of practical use in the anchorage of reinforcing elements, such as a rock bolt. When the cartridge of the invention is to be used in a coal mine, the gelling agent should preferably have a flash point in excess of 100° C. Liquid gelling agents which have been found to be particularly suitable for use in this embodiment of the invention are the esters or partial esters formed from a polyol, preferably a glycol or glycerol, and a lower aliphatic carboxylic acid, for example propylene glycol monoacetate, triethylene glycol diacetate, glyceryl 1,3-diacetate (also known as diacetin) and glyceryl triacetate (also known as triacetin).

Water-soluble substances capable of influencing certain physical properties of the grouting composition (e.g. setting time, rheology, strength) may be incorporated in constituent (A) and/or constituent (B) provided that they do not substantially limit the shelf-life of either constituent. Examples of such substances are sodium or potassium hydroxide, sulphide, hydrosulphide, sulphite, nitrite, carbonate, halide, nitrate, sulphate or permanganate; alkali metal salts of organic acids (e.g. sodium acetate or potassium toluene sulphonate); and organic compounds such as glycerol, glycols (e.g. triethylene glycol) and polyols (e.g. trimethylolpropane).

Inert water-insoluble fillers or thickeners in various physical forms (e.g. powder, fibre or flake) may be incorporated in constituent (A) and/or constituent (B) to control physical properties (such as rheology and phase separation) of each mixture or of the mixed grouting composition. Examples of these are China clay, silica or limestone sand, glass fibre, natural gum and synthetic polymers. Wetting agents or surfactants (e.g. glyceryl mono-oleate) may be incorporated in small amounts (less than 1%) in constituent (A) and/or constituent (B) in order to control the dispersion of the solid components in each mixture or the rheology of the mixed grouting composition.

It is advantageous to incorporate in constituent (A) and/or (B) a substance capable of reducing the exudation of liquid from the grouting composition on setting. Such compounds include water-miscible, hydroxyl-containing organic compounds, for example glycerol, polypropylene glycol and triethylene glycol.

Whilst the flammability of the grouting cartridge of the invention is considerably lower than that of currently used styrenated unsaturated polyester resin based cartridges, it may be desirable for certain areas of utilisation, for example in coal mines, to reduce even further the flammability of the grouting cartridge and this may be effected by incorporating normally in constituent (B) a fire-retardant additive, for example triammonium phosphate, trisdichloropropyl phosphate, ammonium chloride, 1:1:1-trichloroethane, or antimony oxide in conjunction with a halogenated compound, for example a chlorinated or brominated hydrocarbon.

In formulating constituents (A) and (B) of the cartridge of the invention, the proportions of the ingredients may advantageously be as follows:

|  | Parts by weight |
| --- | --- |
| (A) | |
| Alkali metal silicate | 10–25 |
| Alkali metal siliconate | 0–15 |
| Aqueous liquid | 10–40 |
| Water-soluble additives | 0–10 |
| Water-insoluble additives | 0–50 |
| (B) | |
| Gelling agent | 0.1–20 |
| Water-soluble additives | 0–10 |
| Water-insoluble additives | 0–60 |

In the preferred embodiment of the invention in which constituent (B) contains a hydraulic substance, the latter may be a hydraulic cement, for example Portland cement, high alumina cement, dicalcium silicate or metallurgical slag, a hydraulic solid such as, for example, calcium sulphate or gypsum plaster; or a metal oxide or hydroxide of, for example, calcium, magnesium or iron, which is capable of setting to a hardened mass when mixed with phosphoric acid or a phosphate solution which can be present in constituent (A). A mixture of two or more different hydraulic substances may be used.

In the foregoing embodiment, there may be included in constituent (A) and/or constituent (B) substances capable of influencing the hydration of the hydraulic substance, provided that they do not adversely affect the shelf-life of the mixture concerned or the reactivity or rheology of the mixed grouting composition. Such substances may be accelerators, retarders (e.g. borax for hydraulic cements), flow-promoting agents, water-reducing agents or suspending agents.

In the embodiment in which constituent (B) contains a hydraulic substance, the proportions of the ingredients present in constituents (A) and (B) may be as follows:

|  | Parts by weight |
| --- | --- |
| (A) | |
| Alkali metal silicate | 25–60 |
| Alkali metal siliconate | 0–30 |
| Aqueous liquid | 20–80 |
| Water-soluble additives | 0–15 |
| Water-insoluble additives | 0–100 |
| (B) | |
| Gelling agent | 0.1–50 |
| Non-aqueous liquid vehicle | 0–40 |
| Hydraulic substance | 10–85 |
| Water-soluble additives | 0–20 |
| Water-insoluble additives | 0–40 |

The cartridge of the invention may be manufactured using a variety of suitable casing materials. To some extent the choice of casing material is dependent upon the relative arrangement of the constituents (A) and (B) within the cartridge. Constituent (B) is generally anhydrous but may contain relatively strong solvent materials, whereas constituent (A) is aqueous. Consequently it is possible to use materials such as polyethylene or other polyolefines, polyesters or suitable thermoplastic laminate materials as the frangible casing for constituent (A) and certain of these materials also for the frangible casing for constituent (B). Alternatively, constituent (B) may be packaged in a water-sensitive material such as vegetable parchment, regenerated cellulose, collagen or a similar casing commonly used in the food industry. Thus, in the embodiment where constituent (A) is in the inner part of the cartridge and constituent (B) is in the outer part, a preferred arrangement consists of an inner tube of high density polyethylene tubing and an outer casing of viscose treated paper. If the components are reversed, so that constituent (A) is in the outer part of the cartridge and constituent (B) within the inner tube, it is then necessary to use water resisting casings in both cases, since both casings will be in contact with the aqueous constituent (A).

The casings materials so far described are suitable for use with flexible cartridges, but other materials may be used to produce rigid cartridges for certain purposes. Suitable tubular cartridges may be made from, for example, glass, polystyrene, polycarbonate resin or thermosetting materials such as, for example, phenolic resin-bonded paper.

Other cartridges are possible where the inner constituent may be packaged in an inner rigid tube and the outer constituent in a flexible casing or vice versa. Suitable combinations will be apparent by due consideration of the need to maintain water resistance in any casing material which is in contact with constituent (A) of the cartridge.

The cartridges of the invention may be manufactured by simple processes using conventional extrusion and cartridge clipping equipment. Each constituent may be produced in a suitable mixer of a type commonly used for preparation of low viscosity or medium viscosity pastes in the paint and sealants industries. Examples of such mixers are those of the ribbon blade, Z blade or high speed disperser type.

The following Examples illustrate cartridges in accordance with the invention.

EXAMPLE 1

A grouting cartridge was made by filling in a conventional manner a length of casing of thin-gauge tubular polyethylene film (30 mm diameter) with a paste consisting of:

|  | Parts by weight |
| --- | --- |
| Propylene glycol monoacetate | 5.8 |
| Limestone dust | 20 | and embedding the filled tube within a length of tubular polyethylene film (40 mm diameter) containing a mixture consisting of:

|  | Parts by weight |
| --- | --- |
| Aqueous sodium silicate solution | 14.5 |
| Spray-dried water-soluble sodium silicate | 2.5 |
| Glycerol | 3.8 |

Each resulting length of filled dual compartment cartridge, having a length of about 10 to 15 meters, was passed through a double clipping machine which formed the required sausage-shaped cartridges having an individual length of about 30 cm. by firmly clipping each end of the cartridges.

EXAMPLE 2

A grouting cartridge was made in the manner described in Example 1, except that the inner tube was filled with a paste formed from:

|  | Parts by weight |
| --- | --- |
| Diacetin (glyceryl diacetate) | 5 |
| Triacetin (glyceryl triacetate) | 5 |
| Silica flour | 15 |
| and the outer tube was filled with a paste formed from:- | |
| Aqueous sodium silicate solution | 17.3 |
| Spray-dried water-soluble sodium silicate | 5.9 |
| Glycerol | 6.5 |
| Silica Flour | 10 |

EXAMPLE 3

A grouting cartridge was made by filling in a conventional manner a length of casing of thin-gauge tubular polyethylene film (30 mm diameter) with a mixture consisting of:

|  | Parts by weight |
| --- | --- |
| Aqueous sodium silicate (a 48.5 wt % solution with a silica: sodium oxide molar ratio of 2.47:1) | 84 |
| Glycerol | 19 | and embedding the filled tube within a length of tubular polyethylene film (40 mm diameter) containing a paste consisting of:

|  | Parts by weight |
| --- | --- |
| High alumina cement | 100 |
| Propylene glycol monoacetate | 14.5 |
| Diacetin | 11.3 |
| Glyceryl mono-oleate | 0.5 |

Each resulting length of filled dual compartment cartridge, having a length of about 10 to 15 meters, was passed through a double clipping machine which formed the required sausage-shaped cartridges having an individual length of about 30 cm. by firmly clipping each end of the cartridges.

Four of the grouting cartridges produced in the foregoing manner were placed in a two meter long, 43 mm diameter borehole drilled in coalmine strata and a 2 meter long, 36 mm diameter wooden (ramin) dowel was driven, whilst rotating, through the cartridges using a standard coal mine boring drill, this being accomplished in 30 seconds.

EXAMPLE 4

Grouting cartridges were made in the manner described in Example 3, except that the inner tube was filled with a mixture consisting of:

|  | Parts by weight |
| --- | --- |
| Aqueous sodium silicate (a 43.6 wt. % solution with a silica:sodium oxide molar ratio of 2.58:1) | 29 |
| Glycerol | 7.6 | and the outer tube was filled with a paste consisting of:

|  | Parts by weight |
| --- | --- |
| Ordinary Portland cement | 29.5 |
| Diacetin | 9.6 |

EXAMPLE 5

Grouting cartridges were made in the manner described in Example 3, except that the inner tube was filled with a mixture consisting of:

|  | Parts by weight |
| --- | --- |
| Aqueous sodium silicate (a 43.6 wt. % solution with a silica:sodium oxide molar ratio of 2.58:1) | 29 |
| Water-soluble spray-dried sodium silicate (silica:sodium oxide molar ratio of 2.07:1) | 4.5 |
| Glycerol | 6.5 |

-continued

| | Parts by weight |
|---|---|
| Calcined China clay | 27 | and the outer tube was filled with a paste consisting of:

| | Parts by weight |
|---|---|
| High alumina cement | 25 |
| Ordinary Portland cement | 25 |
| Triethylene glycol diacetate/ diacetin mixture (1:1) | 12.5 |

EXAMPLE 6

Grouting cartridges were made in the manner described in Example 3, except that the inner tube was filled with a mixture consisting of:

| | Parts by weight |
|---|---|
| Aqueous sodium silicate (a 42.3 wt. % solution with silica:sodium oxide molar ratio of 2.74:1) | 29 |
| Water soluble spray-dried sodium silicate (silica:sodium oxide molar ratio of 2.07:1) | 4.5 |
| Glycerol | 6.5 | and the outer tube was filled with a paste consisting of:

| | Parts by weight |
|---|---|
| High alumina cement | 40 |
| Triethylene glycol diacetate/ diacetin mixture (1:1) | 11 |
| Antimony trioxide | 6 |
| 1:1:1-Trichloroethane | 4 |

EXAMPLE 7

Grouting cartridges were made in the manner described in Example 3, except that the inner tube was filled with a mixture consisting of:

| | Parts by weight |
|---|---|
| Aqueous sodium silicate (a 42.1 wt. % solution with a silica:sodium oxide molar ratio of 2.07:1) | 29 |
| Water-soluble spray-dried sodium silicate (silica: sodium oxide molar ratio of 2.07:1) | 4.5 | and the outer tube was filled with a paste consisting of:

| | Parts by weight |
|---|---|
| An autoclave gypsum plaster | 40 |
| Boric acid powder | 0.8 |
| Polypropylene glycol | 12 |

EXAMPLE 8

A grouting cartridge was made by filling a 70 cm. length of thin-gauge tubular polyamide film (17 mm diameter) with a paste consisting of:

| | Parts by weight |
|---|---|
| Propylene glycol monoacetate | 10 |
| High alumina cement | 6 |
| Silica sand | 60 |
| Glyceryl mono-oleate | 0.2 | and embedding the filled tube within a 73 cm. length of tubular polyamide film (22 mm diameter) containing a solution consisting of:

| | Parts by weight |
|---|---|
| Aqueous sodium silicate (silica:sodium oxide molar ratio of 2.5:1) | 29 |
| Water-soluble spray-dried sodium silicate (silica: sodium oxide molar ratio of 2.0:1) | 4.5 |
| Glycerol | 7.6 | both ends of both tubes being sealed off to prevent any leakage of their contents.

The resulting cartridge was placed in a 28 mm diameter borehole drilled to a depth of 70 cm in a concrete block and a 92 cm long, 19 mm diameter rebar bolt was spun through the cartridge to reach the bottom of the borehole with the aid of a 500 r.p.m. air-drill. The following day the bolt was stressed using a hydraulic jack and an anchorage load of 13 tons was registered before the bolt started to move out of the hole.

EXAMPLE 9

A grouting cartridge was made by filling a 70 cm length of thin-gauge tubular polyamide film (13.5 mm diameter) with a paste consisting of:

| | Parts by weight |
|---|---|
| Diacetin | 5 |
| Triacetin | 5 |
| Silica flour | 10 |
| Silica sand | 37.5 | and embedding the filled tube within a 73 cm length of tubular polyamide film (22 mm diameter) containing the following mixture:

| | Parts by weight |
|---|---|
| Aqueous sodium silicate (2.5/1 silica to sodium oxide ratio) | 29 |
| Water-soluble spray-dried sodium silicate powder (2.0/1 silica: sodium oxide ratio) | 4.5 |
| Glycerol | 7.6 |
| Silica flour | 22 | both ends of both filled tubes being sealed off.

The resulting cartridge was placed in a 70 cm deep, 28 mm diameter hole drilled in a concrete block, and a 92 cm long, 19 mm diameter rebar bolt was spun through the cartridge to the bottom of the hole with the aid of a 500 r.p.m. drill. The following day the bolt was stressed using a hydraulic jack and the bolt broke at 14 tons load.

EXAMPLE 10

A cartridge was made in the manner described in Example 9, except that the inner tube was filled with a mixture consisting of:

|  | Parts by weight |
| --- | --- |
| Diacetin | 2.5 |
| Triacetin | 2.5 |
| Tartaric acid | 1.5 |
| Silica flour | 8.5 |
| Silica sand | 20 |

The cartridge was tested for bolt-anchoring capacity in the same way as in Example 9 and gave a maximum value after 3 hours of 8½ tons.

EXAMPLE 11

A cartridge was made in the manner described in Example 9, except that the inner tube was filled with a mixture consisting of:

|  | Parts by weight |
| --- | --- |
| Diacetin | 2.5 |
| Triacetin | 2.5 |
| Ammonium carbonate | 2 |
| Silica flour | 8.5 |
| Silica sand | 20 |

The cartridge was tested in the manner described in Example 9 and gave a maximum value of 7½ tons after 3 hours.

EXAMPLE 12

The following four compositions (A1; A2; A3 and A4) were used for filling four 70 cm lengths of thin-gauge tubular polyamide film (14 mm diameter):

|  | Parts by weight | | | |
| --- | --- | --- | --- | --- |
|  | A1 | A2 | A3 | A4 |
| Diacetin | 5 | 5 | 5 | 5 |
| Triacetin | 5 | 5 | 5 | 5 |
| Silica flour | 10 | 8 | 8 | 8 |
| Silica sand | 37.5 | 35 | 35 | 35 |
| High alumina cement | 0 | 10.5 | 0 | 0 |
| Early strength Portland cement | 0 | 0 | 10.5 | 0 |
| VHE Cement (very high early strength Portland cement from United States Gypsum Co.) | 0 | 0 | 0 | 10.5 |

All four compositions were pastes of approximately the same stiffness. Each filled tube was embedded within a 73 cm length of tubular polyamide film (22 mm diameter) containing the following mixture:

|  | Parts by weight |
| --- | --- |
| Aqueous sodium silicate (2.5/1 silica:sodium oxide ratio) | 29 |
| Water-soluble spray-dried sodium silicate (2.0/1 silica:sodium oxide ratio) | 4.5 |
| Glycerol | 7.6 |
| Silica flour | 22 | both ends of the filled tubes being sealed off.

Each resulting cartridge was place in a 70 cm deep, 28 mm diameter hole drilled in a concrete block, and a 92 cm long, 19 mm diameter rebar bolt was spun through each cartridge to its fullest extent with a 500 r.p.m. drill. The bolts were stressed after one hour using a hydraulic jack and the following anchorage values were recorded before the bolt started to move out of the hole:

| Cartridge containing: | A1 | 7 tons |
| --- | --- | --- |
|  | A2 | 10½ tons |
|  | A3 | 10 tons |
|  | A4 | 12 tons |

The advantage of incorporating cementitious filler in the grouting composition is thus apparent, even at the relatively low level of approximately 8% by weight of the total grouting composition.

EXAMPLE 13

A grouting cartridge was made by filling a 70 cm length of thin gauge tubular polyamide film (13.5 mm diameter) with a paste consisting of:

|  | Parts by weight |
| --- | --- |
| Diacetin | 5 |
| Triacetin | 5 |
| Silica flour | 10 |
| Silica sand | 30 |
| High alumina cement | 7 | and embedding the filled tube within a 73 cm length of tubular polyamide film (22 cm diameter) containing the following mixture:

|  | Parts by weight |
| --- | --- |
| Aqueous sodium silicate (2.5/1 silica:sodium oxide ratio) | 29 |
| Water-soluble spray-dried sodium silicate (2.0/1 silica to sodium oxide ratio | 4.5 |
| Glycerol | 7.6 |
| Silica flour | 22 | both ends of both filled tubes being sealed off.

The resulting cartridge was tested for anchoring capacity in the manner described in Example 9 and the bolt broke at 13½ tons load (after allowing 10 hours for cure of the grouting composition).

EXAMPLE 14

A cartridge was made in the manner described in Example 9, except that the inner tube diameter was 16 mm and the composition used for filling the inner tube was as follows:

|  | Parts by weight |
| --- | --- |
| Diacetin | 5 |
| Triacetin | 5 |

-continued

| | Parts by weight |
|---|---|
| High alumina cement | 30 |
| Silica flour | 3.5 |
| Silica sand | 13 |

The composition used for filling the outer tube of the cartridge was the same as that in Example 9.

On testing the cartridge in the manner described in Example 9, the 19 mm diameter rebar bolt broke at an applied load of 13 tons, the bolt being pulled 3 hours after being inserted through the cartridge.

EXAMPLE 15

A cartridge was made in the manner described in Example 9, except that the inner tube was 16 mm in diameter and was filled with a mixture of the following composition:

| | Parts by weight |
|---|---|
| Triethylene glycol di(monochloro) acetate | 8 |
| Triethylene glycol diacetate | 2 |
| Diacetin | 2 |
| High alumina cement | 30 |
| Antimony trioxide | 8 |
| Silica flour | 4 |
| Silica sand | 15 |

This composition was found to be self extinguishing when attempts to set it on fire with a Bunsen burner were made.

The composition used for filling the outer tube of the cartridge was the same as that used in Example 9. The anchorage capacity of the cartridge, tested by the method described in Example 9, was found to be 10 tons after 8 hours.

EXAMPLE 16

A grouting cartridge was made in the manner described in Example 9, except that the inner tube was 14.5 mm in diameter and was filled with a paste consisting of:

| | Parts by weight |
|---|---|
| Diacetin | 6 |
| Triacetin | 4 |
| Calcite flour | 21 |
| Silica sand | 12 | and the outer tube (22 mm diameter) contained a liquid consisting of:

| | Parts by weight |
|---|---|
| Aqueous sodium silicate (2.5/1 silica:sodium oxide ratio) | 29 |
| Water-soluble spray-dried sodium silicate powder (2.0/1 silica:sodium oxide ratio) | 4.5 |
| Glycerol | 7.6 | the ends of both tubes being sealed off.

The resulting cartridge was tested for bolt anchoring capacity in the manner described in Example 9 and gave a maximum value of 12 tons after a 2½ hour period of cure.

EXAMPLE 17

A grouting cartridge was made in the manner described in Example 13, except that the inner tube was 14.5 mm in diameter and was filled with a paste consisting of:

| | Parts by weight |
|---|---|
| Diacetin | 7 |
| Triacetin | 3 |
| Calcite flour | 19 |
| Silica sand | 12 |
| High alumina cement | 5 | and the outer tube (22 mm in diameter) contained a liquid consisting of:

| | Parts by weight |
|---|---|
| Aqueous sodium silicate (2.5/1 silica: sodium oxide ratio) | 29 |
| Water-soluble spray-dried sodium silicate (2.0/1 silica:sodium oxide ratio) | 4.5 |
| Glycerol | 7.6 |

The resulting cartridge was tested for bolt-anchoring capacity in the manner described in Example 9 and gave a maximum value of 12 tons after a 2½ hour period of cure.

EXAMPLE 18

This Example illustrates the use of a solid gelling agent for the alkali metal silicate, namely calcium aluminate which is present in the high alumina cement used in formulating constituent (B) of the cartridge.

A cartridge was made in the manner described in Example 9, except that the inner tube was 17.5 mm in diameter and contained a paste consisting of:

| | Parts by weight |
|---|---|
| High alumina cement | 40 |
| Cereclor 50LV (chlorinated hydrocarbon liquid) | 8.8 | and the outer tube (22 mm in diameter) contained a liquid consisting of:

| | Parts by weight |
|---|---|
| Aqueous sodium silicate (2.0/1 silica:sodium oxide ratio) | 12.4 |
| Water | 3.6 | the ends of both tubes being sealed off.

The resulting cartridge, which is non-inflammable, was tested in the manner described in Example 9, the bolt being stressed 18 hours after being grouted in the hole. The bolt withstood a load of approximately 10 tons before it commenced to move out of the hole.

We claim:

1. A cartridge for anchoring a reinforcing element in a borehole, comprising
    an outer tubular frangible casing having disposed therein within separate compartments
    (A) an aqueous liquid and an alkali metal silicate, and (B) a gelling agent for the alkali metal silicate, said gelling agent being capable of forming a gel from the alkali metal silicate when brought into contact therewith as a result of the cartridge being broken by the reinforcing element whereby the constituents (A) and (B) are mixed in the borehole so as to form around the reinforcing element a rapidly hardening grout to anchor the reinforcing element in the borehole, constituent (B) optionally containing an hydraulic substance;

constituent (A), when no hydraulic substance is present in constituent (B), consisting essentially of 10–40 parts by weight of aqueous liquid, 10–25 parts of alkali metal silicate, 0–15 parts of alkali metal siliconate, 0–10 parts of water-soluble additives, and 0–50 parts of water-insoluble additives;

and when said hydraulic substance is present in constituent (B), said constituent (A) consists essentially of 20–80 parts of aqueous liquid, 25–60 parts of alkali metal silicate, 0–30 parts of alkali metal siliconate, 0–15 parts of water-soluble additives, and 0–100 parts of water-insoluble additives;

constituent (B), when it does not contain said hydraulic substance, consisting essentially of 0.1–20 parts of gelling agent, 0–10 parts of water-soluble additives, and 0–60 parts of water-insoluble additives;

constituent (B), when it contains said hydraulic substance, consisting essentially of 0.1–50 parts of gelling agent, 0–40 parts of non-aqueous liquid vehicle, 10–85 parts of said hydraulic substance, 0.20 parts of water-soluble additives and 0–40 parts of water-insoluble additives;

constituent (B) being in paste form, said gelling agent having a flash point in excess of 100° C., said gelling agent being inert with respect to the hydraulic substance and also being compatible with the hardening process involving the hydraulic substance when said hydraulic substance comes into contact with the aqueous liquid present in constituent (A), and said constituent (B) including as said non-aqueous liquid vehicle or water-soluble additives a substance capable of reducing the exudation of liquid from the mixed composition on setting.

2. A cartridge as claimed in claim 1, wherein said substance capable of reducing the exudation of liquid from the mixed composition on setting is a water-miscible, hydroxyl-containing organic compound.

3. A cartridge as claimed in claim 2, wherein said water-miscible, hydroxyl-containing organic compound is selected from the group consisting of glycerol, propylene glycol and triethylene glycol.

4. A cartridge as claimed in claim 1, wherein said gelling agent is a liquid ester or partial ester of a polyol and a lower aliphatic carboxylic acid.

5. A cartridge as claimed in claim 4, wherein said liquid gelling agent is selected from the group consisting of propylene glycol monoacetate, triethylene glycol diacetate, diacetin and triacetin.

6. A cartridge as claimed in claim 1, wherein constituent (B) comprises said hydraulic substance which is a hydraulic cement.

7. A cartridge as claimed in claim 1, wherein one of the constituents (A) or (B) is contained in an inner tubular frangible casing which is disposed within the outer tubular frangible casing, said inner frangible casing constituting one of said separate compartments, the annular space between the inner and outer casings containing the other constituent and constituting the other separate compartment.

8. A cartridge as claimed in claim 1, wherein the alkali metal silicate is sodium silicate.

9. A cartridge as claimed in claim 1, wherein part of the total silicate is used in the form of an aqueous solution and part is used in solid form.

10. A cartridge as claimed in claim 1, wherein constituent (A) and/or (B) further comprise(s) said water-soluble or water-insoluble additive for controlling the physical properties of the constituent(s) or of the grouting composition.

11. A cartridge as claimed in claim 3, wherein the compound is glycerol.

12. A process of anchoring a reinforcing element in a borehole, comprising:
providing a cartridge in accordance with one of claims 1 or 6;
placing at least one said cartridge in a borehole; and
inserting a reinforcing element in said borehole and thereby breaking said cartridge and causing the contents thereof to become mixed, thereby rapidly forming a gel of said alkali metal silicate to anchor said reinforcing element in the borehole.

* * * * *